United States Patent [19]
Hadjigeorge

[11] Patent Number: 5,622,677
[45] Date of Patent: Apr. 22, 1997

[54] VENTURI RISER REACTOR AND PROCESS FOR CATALYTIC CRACKING

[75] Inventor: George A. Hadjigeorge, Sugar Land, Tex.

[73] Assignee: Shell Oil Company, Houston, Tex.

[21] Appl. No.: 783,592

[22] Filed: Oct. 28, 1991

[51] Int. Cl.⁶ .................................................. F27B 15/08
[52] U.S. Cl. .................. 422/144; 422/147; 422/145; 208/155; 208/158
[58] Field of Search .................... 208/113, 146, 208/155, 156, 157, 158, 144, 147; 422/213, 214, 215, 145

[56] References Cited

U.S. PATENT DOCUMENTS

| | | | |
|---|---|---|---|
| 3,353,925 | 11/1967 | Baumann et al. | 422/215 |
| 4,295,967 | 10/1981 | Kurima et al. | 210/189 |
| 4,427,537 | 1/1984 | Dean et al. | 208/113 |
| 4,590,038 | 5/1986 | Schreiber et al. | 422/142 |
| 4,725,408 | 2/1988 | Pratt et al. | 422/144 |
| 4,799,937 | 1/1989 | Nieminen | 48/62 |

FOREIGN PATENT DOCUMENTS

| | | | |
|---|---|---|---|
| 0145888 | 1/1981 | German Dem. Rep. | B01J 8/24 |
| 7-0836-835 | 10/1978 | Japan | B01J 8/28 |
| 1301435 | 4/1987 | U.S.S.R. | B01D 11/02 |

*Primary Examiner*—Helane Myers
*Attorney, Agent, or Firm*—Kim Muller

[57] ABSTRACT

An improved riser reactor containing a plurality of substantially vertically oriented venturis connected in series whereby the venturis have a maximum diameter, $D_1$, and a minimum diameter, $D_2$; and, apparatus for connecting the venturis end to end in which the cross-sectional area of the venturis at $D_1$ is $A_1$ and the cross sectional area at $D_2$ is $A_2$ and the ratio of $A_1/A_2$ is between about 1.1 and about 113, preferably between about 2 and about 100, most preferably between about 5 and about 50. The present invention also includes a process for catalytic cracking of a liquid hydrocarbon feed by use of the riser reactor of this invention.

22 Claims, 1 Drawing Sheet

VENTURI RISER REACTOR AND PROCESS FOR CATALYTIC CRACKING

BACKGROUND OF THE INVENTION

1. Field of the Invention

This invention relates to a riser reactor and a process for catalytic cracking of a hydrocarbonaceous feed, and more particularly a process for cracking a hydrocarbonaceous feed to gasoline range hydrocarbons.

2. Description of the Related Art

Fluidized catalytic conversion processes, such as fluidized catalytic cracking for the processing of petroleum fractions are well known. In a fluidized catalytic cracking process, a hydrocarbon oil feedstock is contacted with a catalyst in a reaction zone under conditions such that the hydrocarbon feedstock is converted into desired products accompanied by the deposition of coke on the surface of the catalyst particles. Such systems may comprise a transport or riser type reaction zone through which the feed hydrocarbon and a solid particulate catalyst suspended in feed hydrocarbon are passed concurrently. The reaction products and catalyst are discharged from the riser reaction zone into a separation zone in which hydrocarbons and normally gaseous by-products of the cracking reaction are separated from the catalyst.

In a riser reactor, as the mixture of catalyst and hydrocarbon feed passes upwardly through the reaction zone, the catalyst becomes partially deactivated due to the deposition of coke thereon and is referred to as "spent" catalyst as contrasted with regenerated or "fresh" catalyst. The spent catalyst from the reaction zone may be regenerated by reaction with oxygen or air.

In an ideal riser reactor the oil and catalyst move in concurrent upflow at relatively high velocities (50–100 ft/sec). At these velocities both the oil and catalyst move in plug flow without any slip. The fresh catalyst is contacted with the fresh feed and the spent catalyst is contacted with the products. As a result of this and the short residence time of the catalyst in the reactor, the extent of the secondary cracking reactions, which destroy gasoline range components to form coke and gas, is minimized. This is a very important characteristic of riser reactors. There is a characteristic rapid decline of catalyst activity in riser reactors due to the coke deposition on the catalyst. As a result of this, the bulk of the conversion occurs at the very bottom of the riser and oil/catalyst contacting at the inlet is very important.

In designing a pilot plant size riser reactor for use in testing new catalysts it is important to match commercial riser reactor performance. To do this it is necessary to design the reactor such that: (1) the catalyst and oil are contacted in a concurrent upflow or down flow fashion so that the feed contacts fresh catalyst and the products contact spent catalyst; (2) the reactor is operated at steady state with oil and catalyst fed and withdrawn continuously so that activity and coke profiles can be maintained along the length of the reactor; and (3) the catalyst feed rate is relatively low in order to minimize the amounts of oil and catalyst needed for each evaluation and to speed up generation of data.

A design that meets these requirements is a small upflow or down flow riser. However, such a reactor is very difficult to build and operate because it is extremely difficult to continuously feed a small flow of catalyst and to measure it in a reproducible manner. Additionally, it is difficult to maintain a constant catalyst to oil ratio in a riser with very small flows. Also, if the diameter of the reactor is too small it will be extremely difficult to circulate catalyst without encountering plugging problems and severe wall effects and to obtain effective catalyst and oil contacting at the inlet.

A number of different designs for riser reactors or fluidized bed reactors have been proposed. U.S. Pat. No. 4,295,967 (filed May 23, 1980) discloses an apparatus comprised of multiple fluidized beds provided with one or more trays having a number of inverted frustum-shaped depressions with an opening located therein. U.S. Pat. No. 4,725,408 (filed Feb. 16, 1988) discloses an apparatus for catalytic cracking of a selected portion of a hydrocarbon feedstock comprising a riser reactor and a catalyst regenerator, a regenerated catalyst cooler, and an absorber. German Democratic Republic Patent No. 145-888 discloses a main fluidized reaction bed supplied with solids entrained by gas rising vertically From a secondary fluidized bed or other reaction system. The flowing medium containing the powdered solids passes through a diffuser grid separating the two beds and having apertures with a lower converging section and upper diverging section, separated by a diffuser throat.

It has now been discovered that a particular riser reactor design produces improved results in catalytic cracking.

SUMMARY OF THE INVENTION

The present invention comprises an improved riser reactor for catalytic cracking of a hydrocarbon feed. The riser reactor comprises a plurality of substantially vertically oriented venturis connected in series whereby the venturis have a maximum diameter, $D_1$, and a minimum diameter, $D_2$; and, means for connecting the venturis end to end in which the cross-sectional area of the venturis at $D_1$ is $A_1$ and the cross-sectional area at $D_2$ is $A_2$ and the ratio of $A_1/A_2$ is between about 1.1 and about 113, preferably between about 2 and about 100; most preferably between about 5 and about 50. The present invention also comprises a process for catalytic cracking of a liquid hydrocarbon feed by use of the riser reactor of this invention.

BRIEF DESCRIPTION OF THE DRAWINGS

FIG. 1 is a cross-sectional view of an embodiment of the invention in which cylindrical sections are connected by venturis to form a riser.

FIG. 2 is a cross-sectional view of an embodiment of the invention in which multiple venturis are connected to form a riser.

DETAILED DESCRIPTION OF THE INVENTION

The invention will be more clearly understood from the following description wherein reference is made to the accompanying drawings. The drawings showing the invention are schematic and not necessarily to scale.

Figure 2:
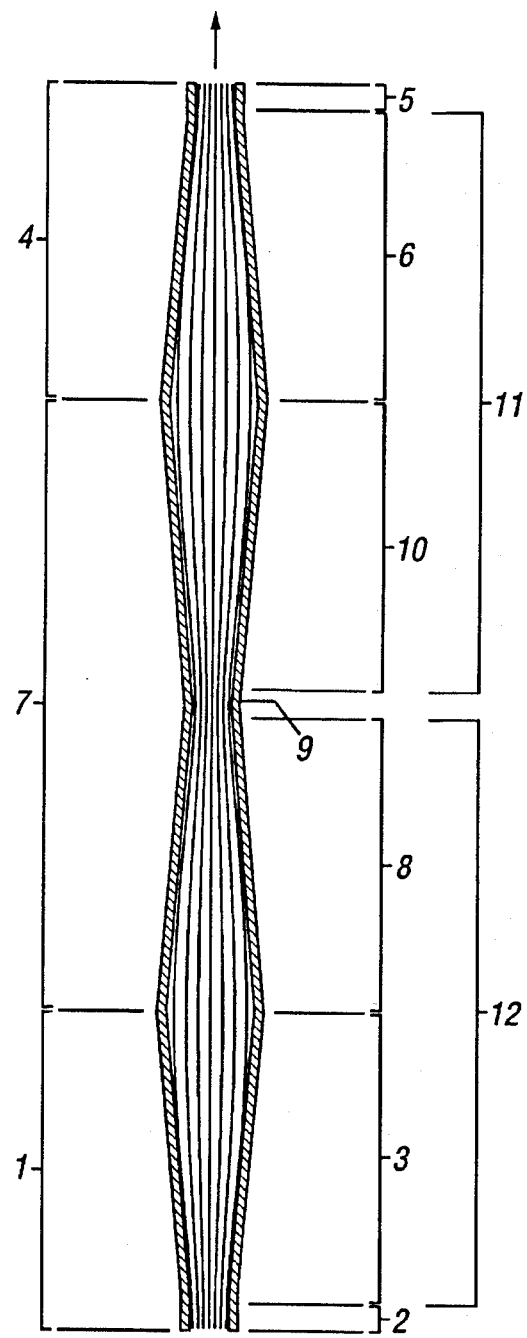

FIG. 2 represents a cross section of a vertical section of the present invention and will be utilized to illustrate two preferred embodiments of the present invention. The first embodiment comprises a feed section 1 comprised of cylindrical section 2 and diverging section 3; exit section 4 comprised of cylindrical section 5 and converging section 6; feed section 1 and exit section 4 being connected by venturi 7 comprised of converging section 8, throat 9, and diverging section 10. The second embodiment depicted in FIG. 2 comprises two reaction chambers 11 and 12, attached by connecting means 9, where reaction chambers 12 is connected to feed section 2 and reaction chambers 11 is connected to exit section 5.

Venturi 7 of FIG. 2 depicts one of two or more venturi sections in the riser reactor of this invention. The riser reactor is preferably substantially vertically oriented with the venturis connected in series. The maximum diameter, $D_1$, of each venturi occurs at the junction of the large diameter end of converging section 8 of one venturi or of exit section 4 and the large diameter end of the diverging section 10 of the adjacent venturi or of the feed section 1. The minimum diameter, $D_2$, of each venturi occurs at throat 9. At this junction is a means for connecting the diverging and converging section of the venturis. The cross-sectional area of the venturis at $D_1$ is $A_1$ and the cross-sectional area at $D_2$ is $A_2$. To insure that the feed and catalyst are accelerated through the throat of the venturi the ratio of $A_1/A_2$ should be between about 1.1 and about 113, preferably between about 2 and about 100, most preferably between about 5 and about 50.

With reference to FIG. 2, in one preferred embodiment the first venturi (represented by element 7 which represents the sole venturi or one venturi in a series of two or more serially connected venturis) is connected to a cylindrical or cone shaped supply pipe 1, with diameter $D_1$, through which the hydrocarbon and catalyst are fed. The last venturi is connected to a cylindrical or cone shaped discharge pipe 4 through which the catalyst and hydrocarbon are removed. Each venturi is made up of a cylindrical inlet at the large diameter end of element 8 having a diameter, $D_1$, equal to that of supply pipe 1. Each venturi also has a contracting portion 8 having the configuration of a frustum of a cone and having a preferred vertex angle of greater than 0 to 30 degrees, preferably between 8 and 10 degrees, where vertex angle means twice the angle between the wall of the frustum of a cone and the vertical. The contracting portion 8 is connected to throat 9. Throat 9 preferably has a diameter $D_2$ which is about ¼ to about ½ of $D_1$, the supply pipe diameter. The length of the throat is 0 or greater, preferably about or greater than ½ of $D_2$ and is less than $D_2$. Throat 9 is connected with a downstream section 10 of the venturi having the configuration of a frustum of a cone. The downstream section 10 has a diameter which diverges from the diameter of the throat 9 to the diameter of the discharge pipe 4. The vertex angle of the downstream section 4 is preferably 30 degrees or less and greater than 0. The junction connecting the inlet section 8, throat 9, and outlet section 10 should be formed by gradually curving surfaces to minimize flow disruption.

Referring to FIG. 2, in another preferred embodiment of the invention the riser reactor comprises a cylindrical venturi chamber 9. In laboratory sized reactors designed to test catalysts or in other operations where a small reactor is desirable, each such chamber 9 is preferably ¹⁄₁₆ to ⅛ inches long. The length of the venturi chamber 9 will increase with the overall dimensions of the reactor. The venturi chamber 9 is attached at both ends to connecting chambers 8 and 10. Connecting chambers 8 and 10 preferably have the configuration of a frustum of a cone and, in laboratory sized reactors designed to test catalysts or in other operations where a small reactor is desirable, preferably have a wall thickness of 0.5 inches which helps maintain isothermal conditions. The wall thickness of the connection chambers may be varied with the overall dimensions of the reactor. The angle between the internal walls of the connecting chambers 8 and 10 and the vertical should be greater than zero and less than 45 degrees, preferably between 1 and 9 degrees, and most preferably between 4 and 6 degrees. The small diameter end of each connecting chambers 8 and 10 is attached to the ends of venturi chamber 9. Preferably, connecting chambers 8 and 10 have substantially equal dimensions.

Figure 1:
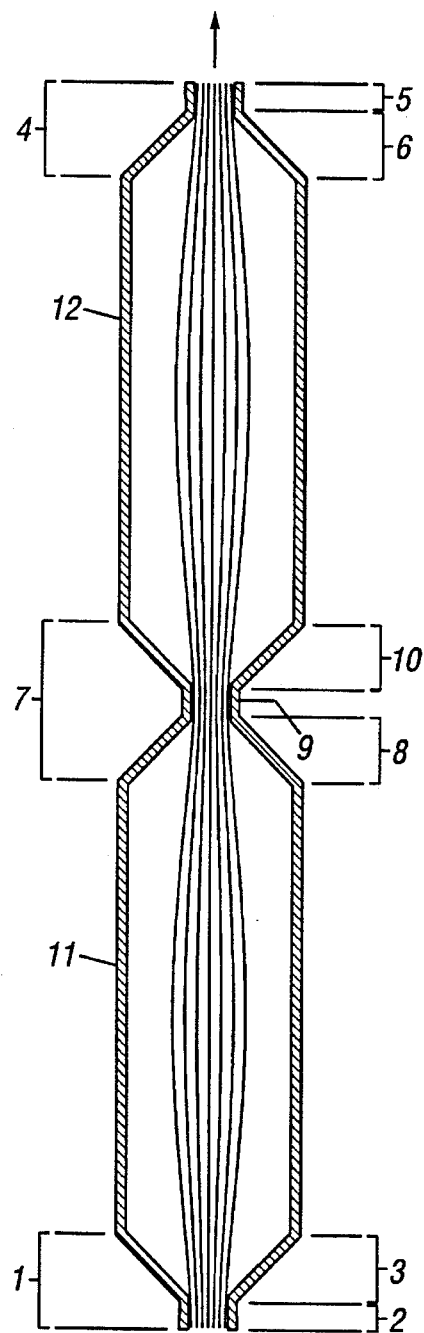
FIGS. 1 and 2 of the drawing are diagrammatic representations of preferred forms of the apparatus forming a part of the present invention and particularly adapted to carrying out the processes of this invention.

An additional preferred embodiment of the invention can be described as follows. References are to FIG. 1 except when stated as being to FIG. 2. The invention comprises a riser reactor which comprises a plurality of vertically oriented reaction chambers in series, elements 11 and 12. The internal diameters of the reaction chambers gradually increase from each end towards the middle reaching a maximum diameter, $D_1$, at or before the middle. Whether the maximum diameter occurs at the middle or before the middle is the distinguishing point between FIG. 1 and 2. If the maximum occurs at the middle then this is represented by FIG. 2. If the maximum occurs before the middle then this is represented by FIG. 1.

The angle of the walls to the vertical is important to the utility of the invention. This angle can be defined as follows. The angle between the shortest straight line connecting a point 1 on the internal wall to a point 2 on the internal wall and the vertical is greater than zero and less than 45 degrees where point 1 is the closest point on the internal wall of the reaction chambers 11 and 12 to point 2 where its internal diameter is at a minimum and point 2 is the closest point on the internal wall of the reaction chambers 11 and 12 to point 1 where the diameter of the reaction chambers is at its maximum. Thus the lines from which the angles are measured do not necessarily follow the internal walls of the reaction chambers. The walls may be straight or, e.g., they may be concave or convex.

The reaction chambers 11 and 12 are connected end to end by connecting means 9. Connecting means 9 may have one or more orifices. Each orifice has a minimum diameter, $D_2$, in which the total cross sectional area of the one or more orifices of the connecting means 9 is $A_2$ and the cross-sectional area of the reaction chambers at its maximum diameter, $D_1$, is $A_1$. The ratio of $A_1/A_2$ is preferably between about 1.1 and about 113, preferably between about 2 and about 100, most preferably between about 5 and about 50.

In a preferred embodiment of the reaction chambers described in the two preceding paragraphs the reaction chambers 11 and 12 have the configuration of two frustums of a cone of equal dimensions connected together at their large diameter ends. Preferably, the wall thickness is such that isothermal conditions are maintained. In laboratory sized reactors designed to test catalysts or in other operations where a small reactor is desirable, a preferable wall thickness is about 0.5 inches. In laboratory sized reactors designed to test catalysts or in other operations where a small reactor is desirable, the reaction chambers preferably have a constant external diameter of about 1.25 inches. Thus, if the external diameter is constant only the internal diameter will vary. Alternatively, the reactor may be constructed such that the external diameter parallels the internal diameter.

Each reaction chamber 11 and 12, is attached to the adjacent reaction chamber by a cylindrical connecting chamber 9 having one or more orifices. It is preferable to keep the length of the connecting chamber 9 short, preferably about ¹⁄₁₆ to about ⅛ inches. However, the preferable length of the connecting chamber 9 may vary with the overall dimensions of the reactor.

The ratio of the length, L, of the line connecting point 1 to point 2, described above, to the diameter of the connecting chambers, D, is between about 25:1 to about 2:1 with a corresponding angle between the line and the vertical between about 1 and about 18 degrees. A more preferable L/D ratio and angle is between about 15:1 and about 5:1 and between about 1 and about 9 degrees respectively. A most preferable ratio and angle is between about 9:1 and about 7:1 and between about 4 and about 6 degrees respectively.

FIG. 2 also represents an embodiment of the invention whereby the riser reactor is used to crack hydrocarbons to produce gasoline range hydrocarbons. The reactor preferably has repetitive alternating gradual variation of internal diameter. The internal diameter would alternate from the smallest diameter, $D_2$, at element 9 which is a diameter reducing means, to the largest diameter, $D_1$. The cross-sectional area of the reactor is $A_1$ at $D_1$ and is $A_2$ at $D_2$. The preferable ratio of $A_1$ to $A_2$ is between about 1.1 and about 113, preferably between about 2 and about 100, most preferably between about 5 and about 50.

A substantial factor contributing to the utility of this invention is the intermittent increase in velocity of the feed materials. Accordingly, the invention can be described as one or more vertically oriented chambers, 11 and 12 in FIG. 2, connected serially with means 9 for temporarily increasing the velocity of the feed materials. The increase in velocity above the average velocity through the chambers should be between about 20 and about 1000%. A more preferred range is between about 400 and about 600%. The means for increasing the velocity may be a constriction point 9 connecting the chambers. The constriction point 9 may comprise one or more orifices which may be of any geometric shape, e.g., circular, oval, square, or rectangular.

The subject matter of the present invention also comprises a process for contacting a hydrocarbon fluid with catalytic particles by use of the apparatus of this invention as described above.

One embodiment of the process of this invention is a process for contacting a hydrocarbon fluid with catalytic particles. The process comprises feeding the fluid and particles into the bottom and, optionally, into one or more intermediate feed points, of the riser reactor of this invention having any of the designs described above. The fluid and particles are then removed from the top and, optionally, from one or more intermediate locations of the reactor. The feed and removal sites may be reversed, i.e., the top may be the feed point and the bottom may be the removal point. It is preferred that the particles be passed through the reactor such that they do not exceed the angle of internal friction, thereby reducing the likelihood of a stoppage. This is best achieved by keeping the throat short. The "angle of internal friction" as used in this specification means the angle determined by the so-called piston test. This consists of pouring the solid catalyst particles slowly into a tube fitted with a freely movable piston. It will be found that, if the bed within the tube has a ratio of height to inside diameter of the tube less than a critical value, it will be very easy to push the piston and bed up the tube. Upon adding more solids, however, and repeating the test at higher values of $L/D_t$ (height of bed within the tube divided by the tube diameter), a critical height will be found above which it will be essentially impossible to budge the piston in an upward direction. If carried out carefully, this critical $L/D_t$ is easily detected. $L/D_t$ is the tangent of the angle of internal friction of the catalyst particles. See A. Zenz, *Fluidization and Fluid—Particle Systems*, 75–93 (Reinhold Pub. Corp., N.Y.), which is hereby incorporated by reference. It is also preferred that the feed velocity be sufficient to cause the particles to maintain a velocity equal to that of the fluid feed material during passage through the reactor. The velocity should also be such that there is little to no slippage, i.e., the particles do not drop back into a lower reaction chamber. The slip ratio is preferably less than 1.1. "Slip ratio" as used in this specification means the velocity of the gas divided by the velocity of the catalyst particles.

A second embodiment of the process of this invention is a process for making gasoline range hydrocarbons. A hydrocarbon fluid is contacted with catalytic particles by feeding them into the bottom and, optionally, into one or more intermediate locations of a riser reactor of this invention having any of the designs described above. The fluid and particles are then removed from the top and, optionally, from one or more intermediate locations of the reactor. The feed and removal sites may be reversed, i.e., the top may be the feed point and the bottom may be the removal point. When the feed is at the bottom and the removal at the top then the preferred velocity is a velocity such that the catalyst particles are maintained in a fluidized state during passage through the reactor.

A third embodiment of the process of this invention is a process for contacting a hydrocarbon fluid with catalytic particles, preferably to cause cracking of the hydrocarbon fluid. The preferred product of the cracking process is gasoline range hydrocarbons. The fluid and catalytic particles are fed in concurrent flow into the bottom and, optionally, inot one or more intermediate locations of a riser reactor of this invention having any of the designs described above. the purpose of concurrent flow is to have the fluid feed ontact fresh catalyst particles and the products of the cracking contact spent catalyst. The feed velocity is between about 0 to about 100 feet per second, preferably between 15 to 20 feet per second, and/or such that the slip ratio of the catalyst particles is less than about 1.1. The velocity of the catalyst particles may be up to about 15% less than the velocity of the hydrocarbon fluid.

After feeding, the hydrocarbon fluid is cracked, preferably under isothermal and steady state process conditions. That is, the hydrocarbon fluid and catalyst preferably are fed and withdrawn from the reactor continuously. In addition, the catalyst activity profile and level of coke production profile over the length of the reactor preferably are maintained constant over time. In addition to the cracking step, it is preferably that the fluid and catalyst be temporarily accelerated at one or more locations in the reactor. The purpose of this temporary acceleration is to impart sufficient momentum to the particles so as to prevent them from backmixing.

In a preferred embodiment the temporary acceleration step increases the velocity of the fluid and catalytic particles by between about 20 and about 1000% above their average velocity through the reactor. In a most preferred embodiment the increase in velocity is between about 400 and about 600%. Last the fluid and particles are removed from the top and, optionally, from one or more intermediate locations of the reactor. The feed and removal sites may be reversed, i.e., the top may be the feed point and the bottom the removal point.

Finally, each of the processes of this invention may include a catalyst regeneration step. The regeneration follows the step in which the catalyst is removed from the reactor. In the regeneration step the spent catalyst is reacted with oxygen or air. Then some or all of the regenerated catalyst is recycled back to the one or more feed points.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

What is claimed is:

1. A riser reactor which comprises:

a plurality of substantially vertically oriented venturis connected in series wherein the first venturi is connected to a cylindrical supply pipe and the last venturi is connected to a cylindrical discharge pipe, the venturis comprising an upstream section comprising:

(1) a cylindrical inlet substantially equaling the diameter, $D_1$, of the supply pipe; connected to (2) a contracting portion having the configuration of a frustum of a cone, having a vertex angle of greater than about 0 to about 30 degrees; connected to (3) a cylindrical throat having a diameter, $D_2$, equal to about ¼ to ½ of the supply pipe diameter, $D_1$, the length of the throat being about 0 or greater than 0; the throat being connected with (4) a downstream section having the configuration of a frustum of a cone diverging from the throat diameter to that of the discharge pipe at an angle of about or less than 30 degrees and greater than 0; and wherein the junctions connecting the inlets, throats, or outlets are formed by gradually curving surfaces.

2. The riser reactor according to claim 1 wherein the length of the throat is greater than ½ $D_2$ and less than $D_2$.

3. A riser reactor which comprises:

a plurality of substantially vertically oriented venturis connected in series, whereby the venturis have a maximum diameter, $D_1$, and a minimum diameter, $D_2$; and means for connecting the venturis end to end in which cross-sectional area of the venturis at $D_1$ is $A_1$ and the cross sectional area at $D_2$ is $A_2$ and the ratio of $A_1/A_2$ is between about 1.1 about 113, wherein the first venturi is connected to a cylindrical supply pipe and tile last venturi is connected to a cylindrical discharge pipe, and wherein each venturi orifice comprises an upstream section comprising:

(1) a cylidnrical inlet substantially equaling the diameter, $D_1$, of the supply pipe; connected to (2) a contracting portion having the configuration of a frustum of a cone, having a vertex angle of greater than 0 to about 30 degrees; connected to (3) a cylindrical throat having a diameter, $D_2$, equal to about ¼ to ½ of the supply pipe diameter, $D_1$, the length of the throat greater than or equal to 0; said throat being configured for temporarily increasing the velocity of a fluid hydrocarbon and catalyst particle feed mixture by about 400% to about 600%, the throat being connected with (4) a downstream section having the configuration of a frustum of a cone diverging from the throat diameter to that of the discharge pipe at an angle of about or less than 30 degrees; and wherein the junctions connecting the inlets, throats, or outlets are formed by gradually curving surfaces.

4. The riser reactor according to claim 3 wherein the length of the throat is greater than ½ of $D_2$ and less than $D_2$.

5. The riser reactor according to claim 3 wherein the vertex angle is between about 8 to 10 degrees.

6. The riser reactor according to claim 3 in which each venturi comprises a substantially cylindrical venturi chamber with parallel internal walls connected at both ends to connecting chambers having the configuration, of a frustum of a cone, where the small diameter end of each connecting chamber is connected to the ends of said venturi chamber, and wherein each of the connecting chambers have substantially equal dimensions.

7. The riser reactor according to claim 6 in which each substantially cylindrical venturi chamber is between about 1/16 to about ⅛ inch in length.

8. The riser reactor according to claim 6 in which the angle between the internal walls of each connecting chamber and vertical is greater than zero and less than 45 degrees.

9. The riser reactor according to claim 6 in which the angle between the internal walls of each connecting chamber and vertical is between about 1 and about 9 degrees.

10. The riser reactor according to claim 6 in which the angle between the internal walls of each connecting chamber and vertical is between about 4 and about 6 degrees.

11. The riser reactor according to claim 6 in which the wall thickness of each connecting chamber is about 0.5 inches.

12. A riser reactor which comprises:

a plurality of reaction chambers substantially vertically oriented having internal diameters which gradually increase from each end towards the middle reaching a maximum diameter, $D_1$, at or before the middle whereby the angle between the shortest straight line connecting point 1 to point 2 and the vertical is greater than zero and less than 15 degrees where point 1 is the closest point on the internal wall of the reaction chambers to point 2 where its internal diameter is at a minimum and point 2 is the closest point on the internal wall of the reaction chambers to point 1 where the diameter of the reaction chambers is at its maximum; and, means for connecting the chambers end to end said connecting means having one or more orifices each having a minimum diameter, $D_2$, in which the total cross-sectional area of the one or more orifices of the connecting means is $A_2$ and the cross sectional area of the reaction chambers at its maximum diameter, $D_1$, is $A_1$ and the ratio of $A_1/A_2$ is between about 1.1 and about 113.

13. The riser reactor according to claim 12 in which each reaction chamber is two frustums of a cone of equal dimensions connected together at their large diameter ends and in which the means for connecting the chambers end to end at their small diameter end comprises:

a substantially cylindrical chamber having one or more orifices.

14. The riser reactor according to claim 13 with each reaction chamber having a length, L, to diameter, D, ratio between about 25:1 and about 2:1 where L is the length of the shortest straight line formed by connecting point 1 to point 2 where point 1 is the closest point on the internal wall of the reaction chambers to point 2 where its internal diameter is at a minimum and point 2 is the closest point on the internal wall of the reaction chambers to point 1 where the diameter of the reaction chambers is at its maximum, and where D is the diameter of the connecting chambers, and where the angle between the line and the vertical is between about 1 and about 18 degrees.

15. The riser reactor according to claim 14 with each reaction chamber having a length, L, to diameter, D, ratio between about 15:1 and about 5:1 and where the angle between the line and the vertical is between about 1 and about 9 degrees.

16. The riser reactor according to claim 14 with each reaction chamber having a length, L, to diameter, D, ratio between about 9:1 and about 7:1 and where the angle between the line and the vertical is between about 4 and about 6 degrees.

17. The riser reactor according to claim 13 in which each connecting chamber has a length of between about 1/16 and about 1/8 inches.

18. The riser reactor according to claim 13 in which each reaction chamber has an external diameter of about 1.25 inches whereby the external diameter is substantially constant.

19. The riser reactor according to claim 13 in which each reaction chamber has a wall thickness of about 0.5 inches.

20. A riser reactor for the cracking of hydrocarbons to produce gasoline range hydrocarbons having repetitive alternating gradual variation of internal diameter from largest, $D_1$, to smallest, $D_2$, having a maximum vertex angle of 18 degrees, in which the cross-sectional area of the reactor at $D_1$ is $A_1$ and the cross-sectional area at $D_2$ is $A_2$ and the ratio of $A_1/A_2$ is between about 1.1 and about 113.

21. The riser reactor according to claim 20, further comprising means for reducing the diameter from $D_1$ to $D_2$ which comprises one or more orifices.

22. A riser reactor for contacting fluid feed and fluidized catalytic particulates which comprises:

a plurality of substantially vertical serially connected chambers; and, means for temporarily increasing the velocity of the fluidized particulates passing through the chambers at one or more locations in the chambers by between about 400 and about 600% above the average velocity of the particulates through the chambers.

* * * * *